(12) United States Patent
Tu

(10) Patent No.: US 11,493,390 B2
(45) Date of Patent: Nov. 8, 2022

(54) TEMPERATURE SENSING CIRCUIT

(71) Applicant: Realtek Semiconductor Corporation, Hsinchu (TW)

(72) Inventor: Chih-Chan Tu, Taipei (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 158 days.

(21) Appl. No.: 17/143,488

(22) Filed: Jan. 7, 2021

(65) Prior Publication Data

US 2021/0223115 A1 Jul. 22, 2021

(30) Foreign Application Priority Data

Jan. 20, 2020 (TW) .................................. 109102016

(51) Int. Cl.
*G01K 7/24* (2006.01)
*G05F 3/26* (2006.01)

(52) U.S. Cl.
CPC ............... *G01K 7/24* (2013.01); *G05F 3/267* (2013.01)

(58) Field of Classification Search
CPC ............. G01K 7/24; G01K 7/01; G05F 3/267
See application file for complete search history.

(56) References Cited

U.S. PATENT DOCUMENTS

2017/0227409 A1* 8/2017 Wadhwa ................ G01K 13/00

FOREIGN PATENT DOCUMENTS

CN 109470376 A * 3/2019 ............... G01K 7/01

OTHER PUBLICATIONS

Poki Chen et al., "A Fully Digital Time-Domain Smart Temperature Sensor Realized With 140 FPGA Logic Elements", IEEE Transactions on Circuits and Systems I: Regular Papers, vol. 54, No. 12, Dec. 2007, pp. 2661-2668.
Ying-Chih Hsu et al., "An 18.75µW Dynamic-Distributing-Bias Temperature Sensor with 0.87° C.(3σ) Untrimmed Inaccuracy and 0.00946mm2 Area", 2017 IEEE International Solid-State Circuits Conference (ISSCC), Session 5, 2017.

* cited by examiner

*Primary Examiner* — John W Poos
*Assistant Examiner* — Tyler J Pereny
(74) *Attorney, Agent, or Firm* — Locke Lord LLP; Tim Tingkang Xia, Esq.

(57) ABSTRACT

A temperature sensing circuit includes a current source circuit, a resistor, a bandgap voltage generation circuit, a voltage-equalizing circuit and a temperature determining circuit. The current source circuit has a first current output terminal and a second current output terminal. The bandgap voltage generation circuit includes a pair of bipolar junction transistors. The voltage-equalizing circuit equalizes voltages of a first current output terminal and the second current output terminal. The temperature determining circuit includes a sampling capacitor and a calculation circuit. The sampling capacitor samples a first voltage of a first terminal of the resistor and a second voltage of a second terminal of the resistor. The calculation circuit generates a temperature value by calculating a voltage difference between the first voltage and the second voltage.

10 Claims, 2 Drawing Sheets

TEMPERATURE SENSING CIRCUIT

RELATED APPLICATION

The present application claims priority to Taiwan Application Serial Number 109102016, filed Jan. 20, 2020, which is incorporated herein by reference in its entirety.

BACKGROUND

Technical Field

The present disclosure relates to a temperature sensing technology. More particularly, the present disclosure relates to a temperature sensing circuit.

Description of Related Art

In a low voltage single chip circuit system, characteristics of time variations or signal delays that are different along with temperatures are applied to sense temperature inside the chip. However, common temperature sensing circuits either utilizing a delay line to generate signal with time difference for temperature sensing, or utilizing current difference between current mirrors for temperature sensing, are easily affected by the manufacturing process of the metal oxide field effect transistors in circuits, or by the channel length modulation, resulting in that the temperature sensing may be inaccurate.

Therefore, how to design a new temperature sensing circuit to overcome the disadvantages mentioned above is a problem waiting to be solved for the industries.

SUMMARY

In order to solve the problem mentioned above, one aspect of the present disclosure is to provide a temperature sensing circuit which includes a current source circuit, a resistor, a bandgap voltage generation circuit, a voltage-equalizing circuit and a temperature determining circuit. The current source circuit has a first current output terminal and a second current output terminal. The resistor includes a first terminal that is electrically coupled to the first current output terminal, and a second terminal. The bandgap voltage generation circuit includes a pair of bipolar junction transistors, wherein a first bipolar junction transistor of the pair of bipolar junction transistors is electrically coupled to the second terminal of the resistor, and a second bipolar junction transistor of the pair of bipolar junction transistors is coupled to the second current output terminal. The voltage-equalizing circuit is coupled to the first current output terminal and the second current output terminal and configured to control the current source circuit such that voltages of the first current output terminal and the second current output terminal are equalized. The temperature determining circuit includes a sampling capacitor and a calculation circuit. The sampling capacitor is configured to electrically isolate from the first terminal of the resistor after sampling a first voltage, having a first negative temperature coefficient, of the first terminal of the resistor, in a first operation time period. The calculation circuit is configured to receive the first voltage sampled by the sampling capacitor, and a second voltage, having a second negative temperature coefficient greater than the first negative temperature coefficient, from the second terminal of the resistor, in a second operation time period after the first operation time period and to generate a temperature value by calculating a voltage difference between the first voltage and the second voltage.

The temperature sensing circuit in the present disclosure avoids being affected by the manufacturing process of the metal oxide field effect transistors or the channel length modulation, and calculates time span by high accuracy clock signal to acquire the temperature value, such that the accuracy of the temperature sensing is vastly improved.

BRIEF DESCRIPTION OF THE DRAWINGS

Accompanying drawings in the present disclosure are as follows.

DETAILED DESCRIPTION

All the terms used in this document generally have their ordinary meanings. The examples of using any terms discussed herein such as those defined in commonly used dictionaries are illustrative only, and should not limit the scope and meaning of the disclosure. Likewise, the present disclosure is not limited to some embodiments given in this document.

In this document, it may be understood that the terms "first," "second," and "third" are to describe the various elements, components, zones, levels and/or blocks. However, these elements, components, zones, levels and/or blocks should not be limited by these terms. These terms are used to distinguish one element, component, zone, level and/or block from another. For example, a first element, component, zone, level and/or block may be termed a second element, component, zone, level and/or block without departing from the scope of the present disclosure. As used herein, the term "and/or" includes any and all combinations of one or more of the associated listed items.

The term "coupled" or "connected" in this document may be used to indicate that two or more elements physically or electrically contact with each other, directly or indirectly. They may also be used to indicate that two or more elements cooperate or interact with each other.

Figure 1:
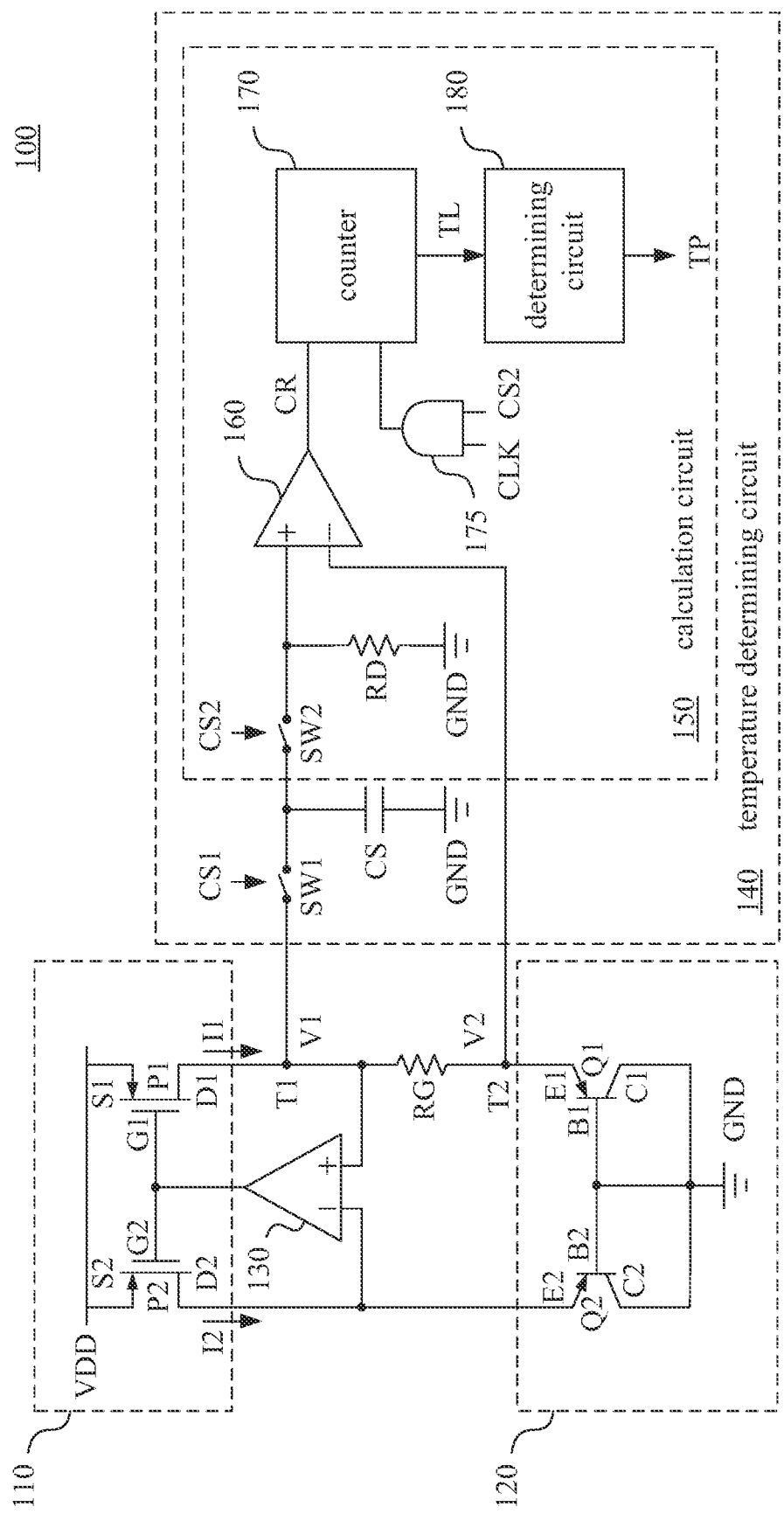
FIG. 1 is a circuit diagram of temperature sensing circuit, in accordance with an embodiment of the present disclosure.

Reference is now made to FIG. 1. FIG. 1 is a circuit diagram of temperature sensing circuit 100, in accordance with an embodiment of the present disclosure. The temperature sensing circuit 100 includes a current source circuit 110, a resistor RG, a bandgap voltage generation circuit 120, a voltage-equalizing circuit 130 and a temperature determining circuit 140.

In an embodiment, the current source circuit 110 is a pair of p-type MOS transistors P1 and P2, wherein a pair of source electrodes of the p-type MOS transistors P1 and P2 is electrically coupled to a voltage source VDD. A drain electrode D1 of the p-type MOS transistor P1 acts as a first current output terminal to output current I1. A drain electrode D2 of the p-type MOS transistor P2 acts as a second current output terminal to output current I2.

Resistor RG comprises a first terminal T1, electrically coupled to the first current output terminal, and a second terminal T2.

Bandgap voltage generation circuit 120 comprises a pair of bipolar junction transistors Q1 and Q2. In an embodiment, the pair of bipolar junction transistors Q1 and Q2 have different current densities when they are turned on. In an embodiment, the bipolar junction transistors Q1 and Q2 have different sizes, causing the bipolar junction transistors Q1 and Q2 have different current densities when they are turned on.

For example, a channel size ratio for the bipolar junction transistors Q1 and Q2 can be N, i.e., the channel size ratio of the bipolar junction transistor Q1 is N times the channel size ratio of the bipolar junction transistor Q2.

In terms of connection relation, a pair of base electrodes B1 and B2 of the bipolar junction transistors Q1 and Q2 is electrically coupled to each other, and the pair of base electrodes 131 and 132 is also electrically coupled to a ground potential GND. A pair of collection electrodes C1 and C2 is electrically coupled to the ground potential GND.

Moreover, an emitter E1 of the bipolar junction transistor Q1 is electrically coupled to a second terminal T2 of the resistor RG. Therefore, the emitter E1 of the bipolar junction transistor Q1 and the first current output terminal, i.e., the drain electrode D1 of the p-type MOS transistor P1, are electrically coupled by the resistor RG, and the emitter E2 of the bipolar junction transistor Q2 and the second current output terminal, i.e., the drain electrode D2 of the p-type MOS transistor P2, are electrically coupled.

The voltage-equalizing circuit 130 is configured to electrically couple the first current output terminal and the second current output terminal (the drain electrodes D1 and D2 of the p-type MOS transistors P1 and P2), and to control the current source circuit 110 such that voltages of the first current output terminal and the second current output terminal are equalized.

More specifically, in an embodiment, the voltage-equalizing circuit 130 is an operational amplifier, and includes a positive input terminal, a negative input terminal, and an output terminal labeled as +, −, and o, in FIG. 1 respectively.

The positive input terminal electrically couples to the first current output terminal (the drain electrode D1 of the p-type MOS transistor P1) and the emitter E1 of the bipolar junction transistor Q1. The negative input terminal electrically couples to the second current output terminal (the drain electrode D2 of the p-type MOS transistor P2) and the emitter E2 of the bipolar junction transistor Q2.

The output terminal is electrically coupled to a pair of gate electrodes G1 and G2, and configured to control the p-type MOS transistors P1 and P2 such that voltages of the first current output terminal and the second current output terminal are equalized.

The current source circuit 110, resistor RG, bandgap voltage generation circuit 120 and voltage-equalizing circuit 130 illustrated above could form a bandgap voltage generation circuit, such that a first voltage V1 of the first terminal T1 of the resistor RG and a second voltage V2 of the second terminal T2 of the resistor RG have negative temperature coefficient. More specifically, when the temperature sensing circuit 100 is located at a higher ambient temperature, the first voltage V1 and the second voltage V2 are lower.

Figure 2:
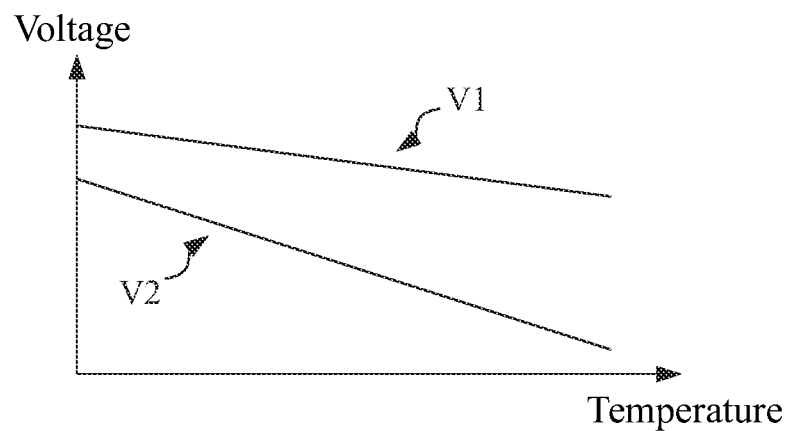
FIG. 2 is a schematic diagram of the first voltage and the second voltage changing with temperature, in accordance with an embodiment of the present disclosure.

Please refer to FIG. 2 at the same time. FIG. 2 is a schematic diagram of the first voltage V1 and the second voltage V2 changing with temperature, in accordance with an embodiment of the present disclosure.

In an embodiment, as illustrated in FIG. 2, a second negative temperature coefficient of the second voltage V2 is greater than a first negative temperature coefficient of the first voltage V1. Therefore, when the temperature sensing circuit 100 is located at a higher ambient temperature, the second voltage V2 will decrease more than the first voltage V1. Furthermore, when the temperature sensing circuit 100 is located at a higher ambient temperature, the voltages difference between the first voltage V1 and the second voltage V2 is higher, and when the temperature sensing circuit 100 is located at a lower ambient temperature, the voltages difference between the first voltage V1 and the second voltage V2 is smaller.

In an embodiment, the base electrodes B1 and B2 of the bipolar junction transistors Q1 and Q2 are electrically coupled to the ground GND, and the first voltage V1 equals to the voltage of the emitter E2 of the bipolar junction transistor Q2. Therefore, the first voltage V1 equals to the base-emitter voltage $V_{BE2}$ (not shown) of the bipolar junction transistor Q2, the second voltage V2 equals to the base-emitter voltage $V_{BE1}$ (not shown) of the bipolar junction transistor Q1. The voltage difference $\Delta V_{BE}$ can be represented by the following formula:

$$\Delta V_{BE} = (kT/q) \times \ln(N) \qquad (1)$$

in which, k is boltzmann constant, q is coulomb constant, T is absolute temperature, N is a ratio of a size or current density of one of the pair of bipolar junction transistors to a size or current density of the other of the pair of bipolar junction transistors.

A temperature determining circuit 140 is configured to determine ambient temperature according to the first voltage V1 and the second voltage V2. In an embodiment, the temperature determining circuit 140 comprises a sampling capacitor CS, a calculation circuit 150, a first switch SW1 and a second switch SW2.

The sampling capacitor CS is configured to sample the first voltage V1 of the first terminal T1 of the resistor RG when the first switch SW1 is conducted, wherein the first switch SW1 is controlled with a first control signal CS1.

The calculation circuit 150 then calculates the first voltage V1, sampled by the sampling capacitor CS, and the second voltage V2 of the second terminal T2 of the resistor RG accordingly when the second switch SW2 is conducted, in order to determine temperature. The second switch SW2 is controlled according to a second control signal CS2.

In an embodiment, the calculation circuit 150 comprises a discharging resistor RD, a comparator 160, a counter 170 and a determining circuit 180.

The discharging resistor RD discharges the sampling capacitor CS when the second switch SW2 is conducted. The comparator 160 electrically coupled to the discharging resistor RD and the second terminal T2 of the resistor RG is configured to compare the first voltage, sampled by the sampling capacitor CS and discharged through the discharging resistor RD, and the second voltage V2 to output a comparing result CR.

The counter 170 further counts the comparing result CR according to a clock signal CLK to determine a time span TL needed for the first voltage V1, sampled by the sampling capacitor CS, discharging to the second voltage V2. The determining circuit 180 then determines temperature value TA according to the time span TL.

Figure 3:
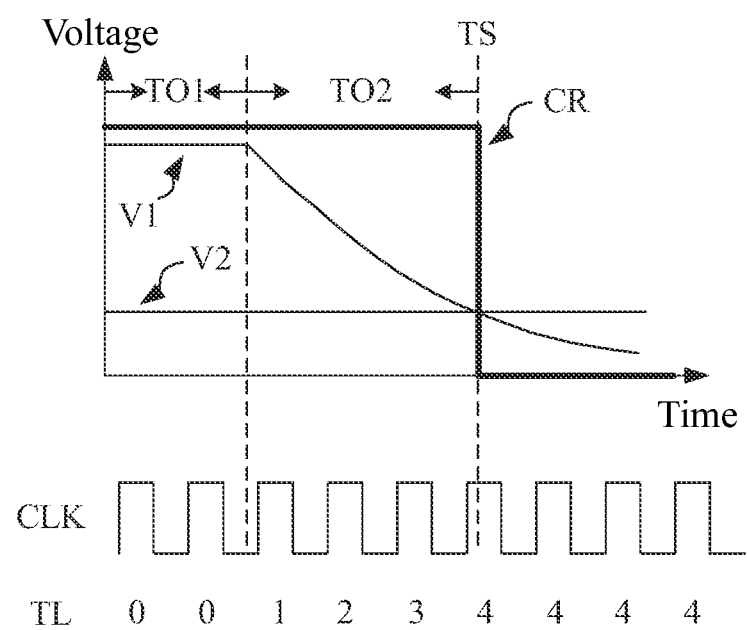
FIG. 3 is a waveform diagram of the first voltage, the second voltage, the comparing result, a clock signal and time span, in accordance with an embodiment of the present disclosure.

Please refer to FIG. 3 at the same time. FIG. 3 is a waveform diagram of the first voltage, the second voltage, the comparing result, a clock signal and time span, in accordance with an embodiment of the present disclosure. The operation of the temperature determining circuit 140 will be further explained with FIG. 1 and FIG. 3 below.

In the first operation time period TO1, the first switch SW1 is conducted and the second switch SW2 is switched off. The sampling capacitor CS and the first terminal T1 of the resistor RG are electrically coupled through the first switch SW1. The first terminal T1 of the resistor RG will charge the sampling capacitor CS to achieve the purpose of the sampling capacitor CS sampling the first voltage V1.

In the second operation time period TO2 after the first operation time period TO1, the first switch SW1 is switched off and the second switch SW2 is conducted. The sampling capacitor CS and the first terminal T1 of the resistor RG will be electrically isolated, and the sampling capacitor CS and the discharging resistor RD will be electrically coupled through the second switch SW2. The discharging resistor RD discharges the sampling capacitor CS through the second switch SW2.

At the same time, the comparator 160 electrically coupled to the discharging resistor RD and the second terminal T2 of the resistor RG is configured to compare voltages in the second operation time period TO2 to output the comparing result CR.

As shown in FIG. 3, because the discharging resistor RD continues to discharge the first voltage V1, sampled by the sampling capacitor CS, the first voltage V1 will become smaller and smaller. Before the time point TS, the first voltage V1 is still larger than the second voltage V2, such that the comparing result CR output by the comparator 160 is at a high state. At the time point TS, the first voltage V1 reaches the same level as the second voltage V2, such that the comparing result CR transits state. After the time point TS, the first voltage V1 is smaller than the second voltage V2, such that the comparing result CR is at a low state.

The counter 170 is configured to count the comparing result CR according to the clock signal CLK in the second operation time period TO2 in order to determine the time span TL for the first voltage V1, sampled by the sampling capacitor CS, discharging to the second voltage V2. In an embodiment, the calculation circuit 150 further includes AND gate 175. AND gate 175 receives the second control signal CS2 and the clock signal CLK at the same time, and feeds the clock signal CLK to the counter 170 to conduct counting only in the second operation time period TO2 according to the second control signal CS2.

In an embodiment, the time span TL is represented by the number of the high state sampled by the clock signal CLK in the second operation time period 102, for example but not limited to, 4 times as shown in FIG. 3. In fact, the time span TL can be deduced by the number of the high state, sampled by the clock signal CLK, multiplied by the per unit period time length of the clock signal CLK. Therefore, when the clock signal CLK has a higher frequency, the time span TL can be measured more precisely.

The determining circuit 180 is configured to determine the voltages difference according to the time span TL, and further generate temperature value TP. When the time span TL is longer, the voltages difference between the first voltage V1, sampled by the sampling capacitor CS, and the second voltage V2 is larger, and the temperature is also higher at the same time. In contrast, when the time span TL is shorter, the voltages difference between the first voltage V1, sampled by the sampling capacitor CS, and the second voltage V2 is smaller, and the temperature is also lower at the same time. Therefore, the determining circuit 180, for example but not limited to, can calculate the voltages difference according to the time span TL first, and then, for example but not limited to, inquire a look up table or curve relation between temperature and the voltages difference to calculate the temperature value TP.

In some approaches, the circuit applied includes a delay line formed by metal oxide field effect transistors or current mirrors, which are easily affected by either manufacturing process of the metal oxide field effect transistors or the channel length modulation, such that the accuracy of the temperature measurement decreases.

The temperature sensing circuit 100 within this present disclosure does not need a delay line or current mirrors, the sampling capacitor CS electrically isolates from the resistor RG and the current source circuit 110 right after sampling the first voltage V1, preventing being affected by the manufacturing process of the metal oxide field effect transistors or the channel length modulation, and further calculates the time span TL by the high accuracy clock signal CLK and acquire the temperature value TP accordingly. Therefore, the temperature sensing circuit 100 within this present disclosure can highly improve the accuracy of the temperature measurement.

It is to be noted that the temperature sensing circuit 100 illustrated in FIG. 1 is only an example. In other embodiments, some other circuit elements can be added to the temperature sensing circuit 100 without affecting the operation of the circuit mentioned above. The present disclosure is not limited by the example.

While the disclosure has been described by way of example(s) and in terms of the preferred embodiment(s), it is to be understood that the disclosure is not limited thereto. Those skilled in the art may make various changes, substitutions, and alterations herein without departing from the spirit and scope of the present disclosure. In view of the foregoing, it is intended that the present invention cover modifications and variations of this invention provided they fall within the scope of the following claims.

What is claimed is:

1. A temperature sensing circuit, comprising:
    a current source circuit having a first current output terminal and a second current output terminal;
    a resistor including a first terminal that is electrically coupled to the first current output terminal, and a second terminal;
    a bandgap voltage generation circuit including a pair of bipolar junction transistors, wherein a first bipolar junction transistor of the pair of bipolar junction transistors is electrically coupled to the second terminal of the resistor, and a second bipolar junction transistor of the pair of bipolar junction transistors is coupled to the second current output terminal;
    a voltage-equalizing circuit coupled to the first current output terminal and the second current output terminal and configured to control the current source circuit such that voltages of the first current output terminal and the second current output terminal are equalized; and
    a temperature determining circuit comprising:
        a sampling capacitor configured to electrically isolate from the first terminal of the resistor after sampling a first voltage, having a first negative temperature coefficient, of the first terminal of the resistor, in a first operation time period; and
        a calculation circuit configured to receive the first voltage sampled by the sampling capacitor, and a second voltage that has a second negative temperature coefficient greater than the first negative temperature coefficient, from the second terminal of the resistor, in a second operation time period after the first operation time period, and configured to generate a temperature value by calculating a voltage difference between the first voltage and the second voltage.

2. The temperature sensing circuit of claim 1, wherein the temperature determining circuit further comprises:
   a first switch configured to be conducted to electrically couple the first terminal of the resistor and the sampling capacitor only in the first operation time period, in order to charge the sampling capacitor; and
   a second switch configured to be conducted to electrically couple the sampling capacitor and the calculation circuit only in the second operation time period.

3. The temperature sensing circuit of claim 2, wherein the calculation circuit comprises:
   a discharging resistor configured to discharge the sampling capacitor through the second switch in the second operation time period;
   a comparator configured to electrically couple the discharging resistor and the second terminal of the resistor, and to compare voltages in the second operation time period to output a comparing result;
   a counter configured to count the comparing result according to a clock signal in the second operation time period, in order to determine a time span for the first voltage, sampled by the sampling capacitor, discharging to the second voltage; and
   a determining circuit configured to determine the voltage difference according to the time span, and to generate the temperature value.

4. The temperature sensing circuit of claim 1, wherein when an ambient temperature is higher, the voltage difference is greater, and when the ambient temperature is lower, the voltage difference is smaller.

5. The temperature sensing circuit of claim 1, wherein the voltage-equalizing circuit is an operational amplifier, and the operational amplifier comprises:
   a positive input terminal electrically coupled to the first current output terminal and a first collection electrodes of the first bipolar junction transistor of the pair of bipolar junction transistors through the resistor;
   a negative input terminal electrically coupled to the second current output terminal and a second collection electrodes of the second bipolar junction transistor of the pair of bipolar junction transistors; and
   an output terminal configured to control the current source circuit.

6. The temperature sensing circuit of claim 1, wherein current density of the first bipolar junction transistor of the pair of bipolar junction transistors is greater than current density of the second bipolar junction transistor of the pair of bipolar junction transistors.

7. The temperature sensing circuit of claim 1, wherein a size of the first bipolar junction transistor of the pair of bipolar junction transistors is greater than the size of the second bipolar junction transistor of the pair of bipolar junction transistors.

8. The temperature sensing circuit of claim 1, wherein the voltage difference between the first voltage and the second voltage is $(kT/q) \times \ln(N)$, k is boltzmann constant, q is coulomb constant, T is absolute temperature, N is a ratio of a size or current density of one of the pair of bipolar junction transistors to a size or current density of the other of the pair of bipolar junction transistors.

9. The temperature sensing circuit of claim 1, wherein a pair of base electrodes of the pair of bipolar junction transistors is coupled to a ground potential.

10. The temperature sensing circuit of claim 1, wherein the current source circuit is a pair of p-type MOS transistors, the first current output terminal and the second current output terminal are a pair of drain electrodes of the p-type MOS transistors, and an output terminal of the voltage-equalizing circuit controls a pair of gate electrodes of the p-type MOS transistors.

* * * * *